United States Patent
Kilgard et al.

(10) Patent No.: US 8,171,461 B1
(45) Date of Patent: May 1, 2012

(54) PRIMITIVE PROGRAM COMPILATION FOR FLAT ATTRIBUTES WITH PROVOKING VERTEX INDEPENDENCE

(75) Inventors: Mark J. Kilgard, Austin, TX (US); Cass W. Everitt, Round Rock, TX (US); Christopher T. Dodd, Woodside, CA (US); Robert Steven Glanville, Cupertino, CA (US)

(73) Assignee: NVIDIA Coporation, Santa Clara, CA (US)

( * ) Notice: Subject to any disclaimer, the term of this patent is extended or adjusted under 35 U.S.C. 154(b) by 1834 days.

(21) Appl. No.: 11/361,769

(22) Filed: Feb. 24, 2006

(51) Int. Cl.
G06F 9/45 (2006.01)
G06F 15/16 (2006.01)

(52) U.S. Cl. ......... 717/136; 717/141; 717/151; 709/232

(58) Field of Classification Search .......... None
See application file for complete search history.

(56) References Cited

U.S. PATENT DOCUMENTS

| | | | |
|---|---|---|---|
| 5,724,074 A | 3/1998 | Chainani et al. | |
| 5,828,837 A * | 10/1998 | Eikeland | 709/232 |
| 5,889,997 A | 3/1999 | Strunk | |
| 6,133,901 A | 10/2000 | Law | |
| 6,469,704 B1 * | 10/2002 | Johnson | 345/553 |
| 6,515,671 B1 | 2/2003 | Lindholm et al. | |
| 6,525,737 B1 | 2/2003 | Duluk et al. | |
| 6,693,639 B2 | 2/2004 | Duluk et al. | |
| 6,697,064 B1 | 2/2004 | Kilgard et al. | |
| 6,894,687 B1 | 5/2005 | Kilgard et al. | |
| 6,940,515 B1 | 9/2005 | Moreton et al. | |
| 6,975,325 B2 | 12/2005 | Morein et al. | |
| 7,015,909 B1 | 3/2006 | Morgan, III et al. | |
| 7,071,945 B2 * | 7/2006 | Parikh et al. | 345/522 |
| 7,159,212 B2 | 1/2007 | Schenk et al. | |
| 7,162,716 B2 | 1/2007 | Glanville et al. | |
| 7,167,181 B2 | 1/2007 | Duluk et al. | |
| 7,196,703 B1 | 3/2007 | Moreton et al. | |
| 7,324,105 B1 | 1/2008 | Moreton et al. | |
| 7,499,051 B1 | 3/2009 | O'Donnell | |
| 7,512,936 B2 * | 3/2009 | Schneider et al. | 717/136 |

(Continued)

FOREIGN PATENT DOCUMENTS

WO 2005010826 2/2005

OTHER PUBLICATIONS

Franziska Roesner, User-Driven Access Control: A New Model for Granting Permissions in Modern Operating Systems [online], Apr. 19, 2011 [retrieved on Dec. 22, 2011], pp. 1-21 . Retrieved from the internet: <URL: http://www.franziroesner.com/pdf/quals-udac.pdf>.*

(Continued)

Primary Examiner — Thuy Dao
Assistant Examiner — Hanh T Bui
(74) Attorney, Agent, or Firm — Patterson & Sheridan, LLP.

(57) ABSTRACT

Systems and methods for compiling high-level primitive programs are used to generate primitive program micro-code for execution by a primitive processor. A compiler is configured to produce micro-code for a specific target primitive processor based on the target primitive processor's capabilities. The compiler supports features of the high-level primitive program by providing conversions for different applications programming interface conventions, determining output primitive types, initializing attribute arrays based on primitive input profile modifiers, and determining vertex set lengths from specified primitive input types.

20 Claims, 8 Drawing Sheets

U.S. PATENT DOCUMENTS

| | | | |
|---|---|---|---|
| 7,598,952 B1 | 10/2009 | O'Donnell | |
| 7,746,347 B1 * | 6/2010 | Brown et al. | 717/151 |
| 8,006,236 B1 * | 8/2011 | Kilgard et al. | 717/136 |
| 2002/0178215 A1 * | 11/2002 | Laksono et al. | 709/231 |
| 2003/0009748 A1 | 1/2003 | Glanville et al. | |
| 2004/0041820 A1 * | 3/2004 | Sevigny | 345/619 |
| 2004/0083465 A1 * | 4/2004 | Zhang et al. | 717/136 |
| 2004/0130552 A1 | 7/2004 | Duluk et al. | |
| 2004/0268328 A1 * | 12/2004 | Plesko et al. | 717/141 |
| 2006/0232598 A1 | 10/2006 | Barenburg et al. | |
| 2007/0169010 A1 * | 7/2007 | Garner et al. | 717/136 |
| 2007/0174818 A1 * | 7/2007 | Pasula | 717/136 |
| 2009/0313004 A1 * | 12/2009 | Levi et al. | 703/28 |

OTHER PUBLICATIONS

David Luebke & Mark Harris, GPGPU: General Purpose Computer on Graphics Hardware [online], 2004 [retrieved on Dec. 22, 2011], pp. 1-289. Retrieved from the internet: <URL: http://delivery.acm.org/10.1145/1110000/1103933/cs32.pdf?>.*

Barenburg, et al. System for Adaptive Resampling in Texture Mapping, (WO 2005/010826 A1) Feb. 3, 2005.

Randi J. Rost, "OpenGL Shading Language", second edition, Jan. 25, 2006, Addison Wesley Professional.

Kilgard, et al. "A System for Programming Graphics Hardware in a C-like Language", University of Texas at Austin and NVIDIA Corp., 2003.

"OpenGL Performer Programmer's Guide", Techpubs library, Dec. 7, 2007.

Kekoa, et al. "A Real-Time Procedural Shading Program for Programmable Graphics Hardware," ACM SIGGRAPH, Aug. 2001.

Shreiner, et al. "An Interactive Introduction to Open GL Programming", SIGGRAPH, 2002, (SIGGRAPH.pdf).

John Douglas Owens, "Computer Graphics on Stream Architecture", Nov. 2002, (Owens 2003.pdf).

Office Action. U.S. Appl. No. 11/361,597, Dated Jul. 9, 2009.

Office Action. U.S. Appl. No. 11/361,789. Dated Jun. 24, 2009.

Office Action. U.S. Appl. No: 11/361,789 dtd. Dec. 28, 2009.

Kilgard, Mark J. "Cg in Two Pages," NVIDIA Corporation, Jan. 16, 2003, pp. 1-2.

Rost, Randi, J. "OpenGL Shading Language," 2nd Edition, Jan. 25, 2006.

Kilgard, et al. "A System for Programming Graphics Hardware in a C-like Language," Univ. of Texas at Austin and NVIDIA Corp., 2003.

Office Action, U.S. Appl. No. 11/361,597, dated May 21, 2010.

Final Office Action, U.S. Appl. No. 11/361,597, dated Oct. 13, 2010.

Office Action, U.S. Appl. No. 11/361,769, dated Apr. 25, 2011.

* cited by examiner

Vertex
301

Figure 3A

Vertex
301
 Vertex
302

Figure 3B

Vertex
304
 Vertex
301
 Vertex
302

Vertex
305

Figure 3C

Vertex
301
 Vertex
302

Vertex
303

Figure 3D

Vertex
306

Vertex
301
 Vertex
302

Vertex
304
Vertex
305

Vertex
303

PRIMITIVE PROGRAM COMPILATION FOR FLAT ATTRIBUTES WITH PROVOKING VERTEX INDEPENDENCE

BACKGROUND OF THE INVENTION

1. Field of the Invention

Embodiments of the present invention generally relate to compiling high-level primitive programs into primitive program micro-code and, more specifically, to compiling the high-level primitive program for execution by a target primitive processor.

2. Description of the Related Art

Recently programmable primitive processors have been developed necessitating the development of compilers to produce primitive program micro-code for execution by the programmable primitive processors. Conventional primitive processors include fixed function units that may be configured, for example to produce particular primitive types, but are not programmable. The capabilities of different programmable primitive processors may vary and a program written for one processor may not run on another processor without modification.

Accordingly, it is desirable to compile primitive programs written in a high-level language into executable micro-code optimized for a particular programmable primitive processor.

SUMMARY OF THE INVENTION

The current invention involves new systems and methods for compiling high-level primitive programs to generate primitive program micro-code. A compiler may be configured to produce micro-code for a specific target primitive processor based on the target primitive processor's capabilities. The compiler also supports features of the high-level primitive program by providing conversions for different applications programming interface conventions, determining output primitive types, initializing attribute arrays based on primitive input profile modifiers, and determining vertex set lengths from specified primitive input types. Therefore, the high-level primitive program may expressly control a particular primitive processor and the micro-code will be optimized for execution by the particular primitive processor, improving performance and portability of the high-level primitive program.

Various embodiments of the invention include a programmable graphics processor configured to perform multi-threaded processing of graphics data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1A:
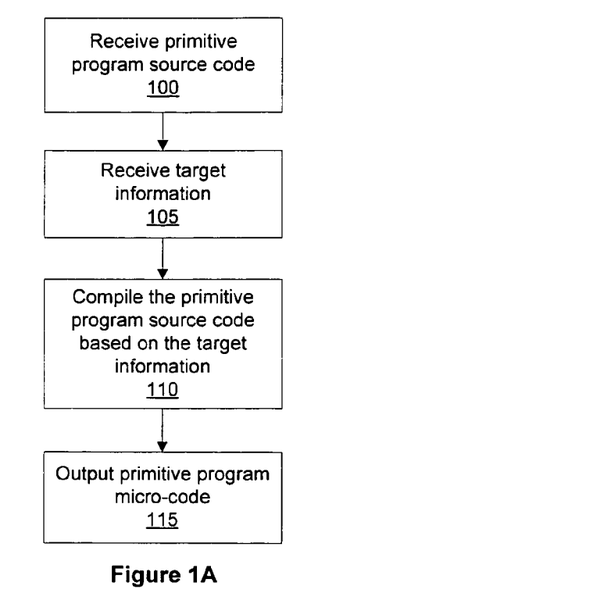
FIG. 1A illustrates a flow diagram of an exemplary method of compiling a high-level primitive program into primitive program micro-code in accordance with one or more aspects of the present invention.

A high-level primitive program is designed to operate on assembled primitives, e.g., triangles, lines, points, and the like. Primitive programs may be used to perform a variety of geometry operations including clipping, primitive subdivision, shadow volume generation, cube map rendering, cylindrical texture wrapping, curve interpolation, spline interpolation, and the like. A compiler is used to convert a high-level primitive program into the micro-code optimized for execution by a particular primitive processor. Therefore, the compiler supports the features of the high-level primitive program and may be configured to optimize and convert the high-level primitive program into micro-code for one or more target primitive processors. FIG. 1A illustrates a flow diagram of an exemplary method of compiling a high-level primitive program into primitive program micro-code in accordance with one or more aspects of the present invention.

In step 100 the compiler receives primitive program source code expressed in a high-level language. In step 105 the compiler receives target information that may specify a particular primitive processor and/or a particular applications programming interface (API), e.g., Microsoft's DirectX™, Open Graphics Library (OpenGL®), or the like. In step 110 the compiler compiles the primitive program source code based on the target information. In step 115 the compiler outputs primitive program micro-code optimized based on the target information.

Figure 1B:
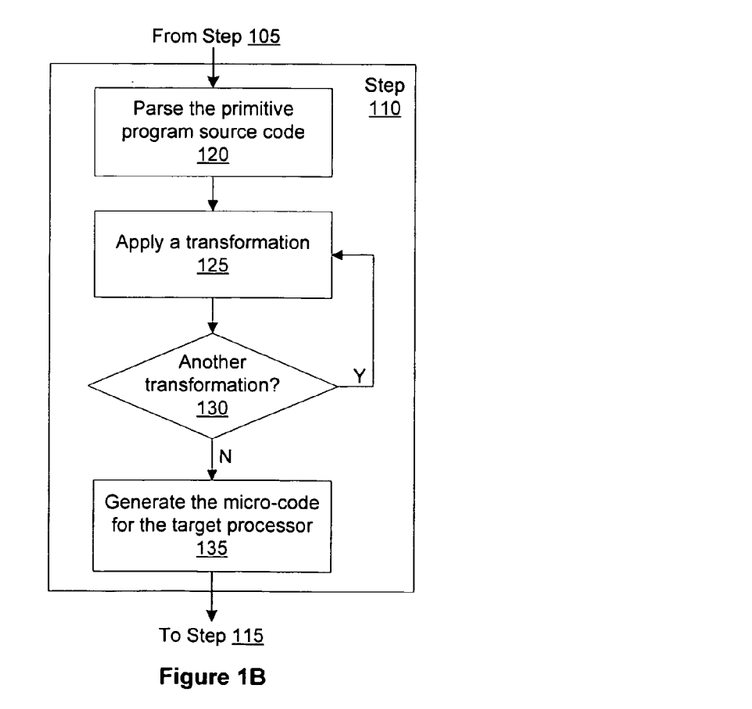
FIG. 1B illustrates a flow diagram of an exemplary method of performing a step of the flow diagram shown in FIG. 1A in accordance with one or more aspects of the present invention.

FIG. 1B illustrates a flow diagram of an exemplary method of performing step 110 of the flow diagram shown in FIG. 1A in accordance with one or more aspects of the present invention. In step 120 the primitive program source code is parsed using techniques known to those skilled in the art. In step 125 a transformation is applied to the primitive program source code. The transformation may modify the primitive program source code for execution by a particular target primitive processor. For example, complex operations that are not supported by the target primitive processor may be broken down into a series of simpler operations. In step 130 the method determines if another transformation should be performed on the primitive program source code, and, if so step 125 is repeated. Transformations may be applied iteratively, as necessary to improve optimization of the primitive program source code. If, in step 130 the method determines that another transformation should not be performed on the primitive program source code, then in step 135 the method generates the micro-code for execution by the target primitive processor.

Figure 2A:
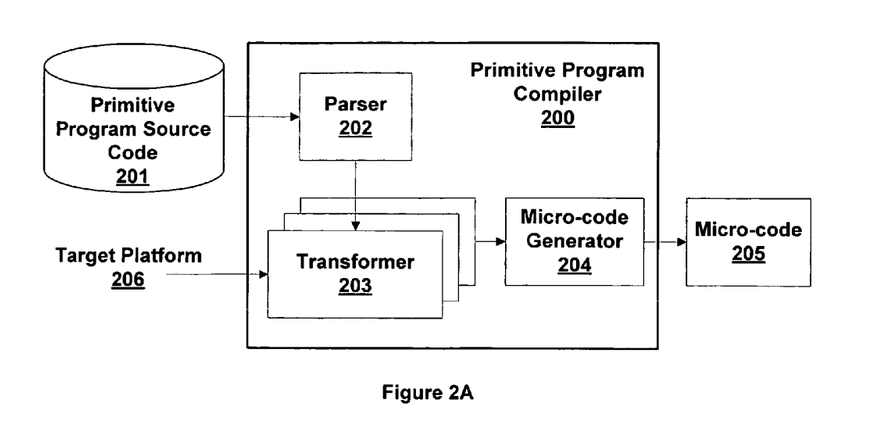
FIG. 2A illustrates a block diagram of an architecture for compiling high-level primitive programs in accordance with one or more aspects of the present invention.

FIG. 2A illustrates a block diagram of a compiler architecture for compiling high-level primitive programs in accordance with one or more aspects of the present invention. A primitive program compiler 200 receives primitive program source code 201 (representing a high-level primitive program) for processing. Primitive program source code 201 may be expressed using a shader language that relies on general-purpose concepts from conventional programming languages such as C++. Primitive programs written in the shader language may be targeted for execution by a variety of different platforms using primitive program compiler 200.

Primitive program source code 201 is processed by a parser 202 using techniques known to those skilled in the art to produce a parsed primitive program. The parsed primitive program is processed by one or more transformers 203 that perform optimizations on the parsed primitive program based on a target platform 206 to produce a transformed primitive program. Target platform 206 may specify a particular primitive processor and/or a particular API that will be used to execute micro-code 205. The transformed primitive program is received by a micro-code generator 204 that converts the transformed primitive program into micro-code 205 for execution on the particular target platform that corresponds to target platform 206. In some embodiments of the present invention, primitive program compiler 200 produces optimized translations of primitive program source code 201 in other high-level hardware shading languages, such as HLSL (high-level shader language) and GLSL (OpenGL®'s shader language).

Figure 2B:
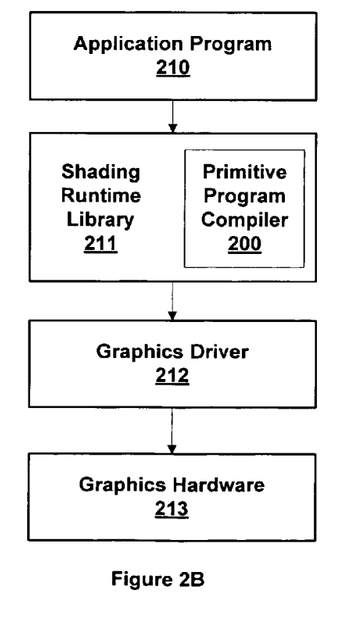
FIG. 2B illustrates a conceptual diagram of a system architecture including the compiler of FIG. 2A in accordance with one or more aspects of the present invention.

FIG. 2B illustrates a conceptual diagram of a system architecture including primitive program compiler 200 of FIG. 2A in accordance with one or more aspects of the present invention. An application program 210 provides primitive program source code 201 and target platform 206. Primitive program compiler 200 is included within a shading runtime library 211. Shading runtime library 211 outputs micro-code 205 to a graphics driver 212. Shading runtime library 211 includes a collection of executable software functions. Graphics driver 212 translates program instructions as needed for execution by graphics hardware 213. In a preferred embodiment of the present invention, graphics hardware 213 includes a programmable primitive processor and primitive program compiler 200 produces micro-code 205 optimized for execution by the programmable primitive processor.

Figure 2C:
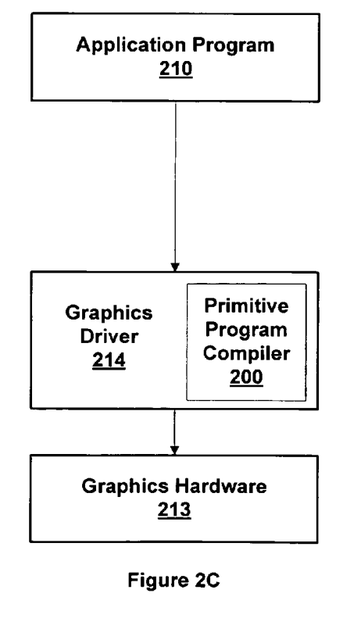
FIG. 2C illustrates a conceptual diagram of another system architecture including the compiler of FIG. 2A in accordance with one or more aspects of the present invention.

FIG. 2C illustrates a conceptual diagram of another system architecture including primitive program compiler 200 of FIG. 2A in accordance with one or more aspects of the present invention. In this embodiment of the present invention, primitive program compiler 200 is embedded within graphics driver 214. Like graphics driver 212, graphics driver 214 translates program instructions as needed for execution by graphics hardware 213. In another embodiment of the present invention, primitive program compiler 200 is a stand-alone compiler.

In conventional graphics processing systems, vertex programs and fragment programs are used to process vertices and fragments, respectively. The corresponding processing units that execute the vertex and fragment programs are programmable while primitive processing is performed using dedicated configurable processing units. Although the configuration of the dedicated processing units may be changed, the operations are limited to the set of computations provided by the dedicated processing units. More recently, graphics processing systems include programmable primitive processing units that execute primitive programs. In addition to the functionality provided by the configurable processing units, the primitive programs may be used to perform more complex or more efficient primitive processing. Primitive programs operate in a graphics processing pipeline subsequent to vertex programs and initial primitive assembly and prior to clipping, perspective division, rasterization, and fragment programs. Unlike vertex programs that output a vertex for each input vertex or fragment programs that output zero or one fragment for each input fragment, primitive programs output zero or more primitives for a set of input vertices.

Figure 3A:
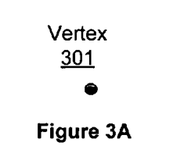
FIGS. 3A, 3B, 3C, 3D, and 3E illustrate input primitive types in accordance with one or more aspects of the present invention.
Figure 3B:
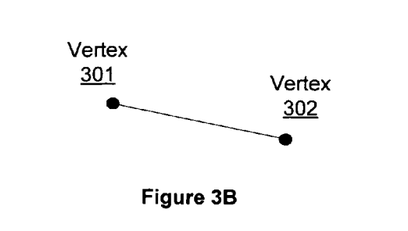
Figure 3C:
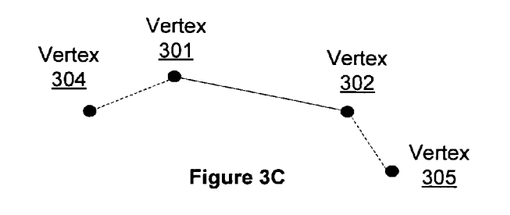

Vertex processing, typically performed by a vertex program, generates a stream of post-transformed vertices. A compiled primitive program, represented by micro-code 205, operates on an assembled primitive, e.g., triangle, line, or point, defined by the stream of post-transformed vertices. FIG. 3A illustrates a point input primitive defined by a vertex 301, in accordance with one or more aspects of the present invention. FIG. 3B illustrates a line segment input primitive defined by a vertex 302 and vertex 301, in accordance with one or more aspects of the present invention. FIG. 3C illustrates a line with adjacency input primitive defined by vertex 301, vertex 302, and adjacency vertices 304 and 305, in accordance with one or more aspects of the present invention.

Figure 3D:
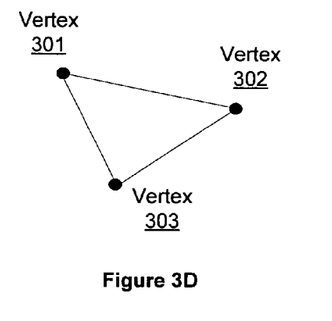
Figure 3E:
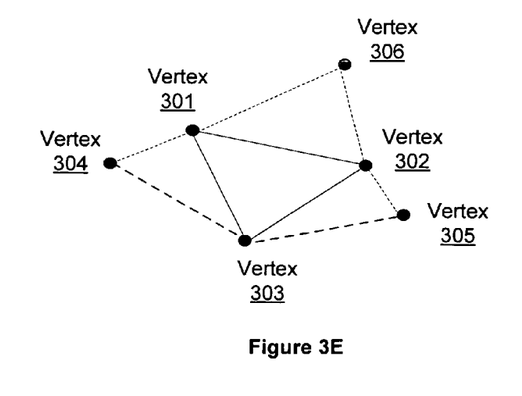

FIG. 3D illustrates a triangle input primitive defined by a vertex 301, vertex 302, and vertex 303, in accordance with one or more aspects of the present invention. More complex geometries, such as quadrilaterals may be divided into two triangle input primitives. FIG. 3E illustrates a triangle with adjacency input primitive defined by vertices 301, 302, 303, and adjacency vertices 304, 305, and 306, in accordance with one or more aspects of the present invention. Adjacency vertices are understood to represent the third vertex forming an edge triangle sharing the triangle primitive's edge. Therefore, a triangle input primitive with adjacency information requires three additional vertices, one for each triangle primitive edge.

A primitive processor executes the primitive program represented by micro-code 205 on each assembled input primitive. Several primitives may be processed in parallel and each primitive program instance may be executed independently, i.e., without communication between the primitive program instances. Each primitive program instance has access to all the transformed vertex attributes output by the upstream vertex processing. Each primitive program instance receives primitive specific input parameters and common uniform parameters. Because each primitive program instance is executed independently, many primitive program instances can execute in parallel for high-performance.

Execution of a primitive program instance produces an ordered stream of zero or more output primitives. Output primitive types include points, line segments, and triangles. The output primitive type may be specified by the primitive program or may be inferred from the input primitive type. Each output primitive is assembled from an appropriate number of vertices that include per-vertex attributes such as clip-space position and per-vertex texture coordinates. These output attributes are used by clipping and interpolation during rasterization. Some primitive programs may perform clipping, in which case, clipped positions are output. When a primitive program is not present, unmodified vertex attributes for each primitive are passed through to clipping and rasterization.

Primitive Input Profile Modifiers

Primitive programs include a geometry profile entry function that returns "void" and indicates the type of input primitive that the geometry program expects. A primitive profile modifier portion of the entry function specifies the primitive input or output type. TABLE I includes examples of several primitive input profile modifiers and their expected inputs.

TABLE 1

| | |
|---|---|
| POINT | 0: single vertex |
| LINE | 0: start vertex of line segment |
| | 1: end vertex of line segment |
| LINE_ADJ | 0: pre-adjacent vertex to line strip |
| | 1: start vertex of line strip |
| | 2: end vertex of line strip |
| | 3: post-adjacent vertex to line strip |
| TRIANGLE | 0: first vertex of triangle |
| | 1: second vertex of triangle |
| | 2: third (last) vertex of triangle |
| TRIANGLE_ADJ | 0: first vertex of triangle |
| | 1: adjacent vertex to first and second vertex of triangle |
| | 2: second vertex of triangle |
| | 3: adjacent vertex to second and third vertex of triangle |
| | 4: third (last) vertex of triangle |
| | 5: adjacent vertex to third and first vertex of triangle |

A primitive program for a point input primitive expects a scalar or one-element array of input variables. A primitive program for a line input primitive expects a two-element array of input variables. The first element is the start vertex and the second element is the end vertex. A primitive program for a line adjacency input primitive expects a four-element array of input variables. The first element is the pre-adjacent vertex, the second element is the start vertex, the second element is the end vertex, and the fourth element is the post-adjacent vertex. For example, in FIG. 3C vertex 304 and vertex 305 may be the first and fourth elements.

A primitive program for a triangle input primitive expects three-element array of input variables. The first element is the first vertex, the second element is the second vertex, and the third element is the third (last) vertex. A primitive program for a triangle adjacency input primitive expects six-element array of input variables. The first element is the first vertex of a triangle, the second element is the adjacent vertex to the first and second vertex of the triangle, the third element is the second vertex of the triangle, the fourth element is the adjacent vertex to the second and third vertex of the triangle, and the fifth element is the third (last) vertex of the triangle, and the sixth element is the adjacent vertex to the third and first vertex of the triangle. For example, in FIG. 3C vertices 301, 302, and 303 are the first, second, and third vertices of the triangle and vertices 306, 305, and 304, respectively, are the adjacency vertices (second, fourth, and sixth elements).

The type of a primitive program (point, line, line adjacency, triangle, adjacency, or other primitive type) can be determined by a compiler based on the primitive input profile modifier specified by the primitive program.

Each type of OpenGL primitive batch supported by "glBegin" corresponds to a different primitive input profile modifier. For example, GL_POINTS corresponds to the point primitive input profile modifier. GL_LINES, GL_LINE_STRIP, and GL_LINE_LOOP correspond to the line primitive input profile modifier. GL_TRIANGLES, GL_TRIANGLE_STRIP, GL_TRIANGLE_FAN, GL_QUADS, GL_QUAD_STRIP, and GL_POLYGON correspond to the triangle primitive input profile modifier. GL_LINES_ADJACENCY_NV and GL_LINE_STRIP_ADJACENCY_NV correspond to the line adjacency primitive input profile modifier. GL_TRIANGLES_ADJACENCY_NV and GL_TRIANGLE_STRIP_ADJACENCY_NV correspond to the triangle adjacency primitive input profile modifier. Other rendering APIs may specify the primitive type for a batch of primitives differently.

A primitive program's entry function should be declared using a profile identifier that is a primitive input profile modifier. For example, a TRIANGLE profile modifier may be used to specify the input primitive type for a primitive program's entry function (simple) as shown in TABLE 2.

TABLE 2

| |
|---|
| TRIANGLE void simple(AttribArray<float4> position : POSITION, uniform float4 flatColor) |

Note that input variables for vertex attributes such as position, are declared as arrays using "AttribArray." as described in further detail below. Using a primitive input profile modifier allows a function to be written independent of the input primitive type. Therefore, one function may be used to process two or more input primitive types rather than writing the same function, once for each input primitive type.

Vertex domain outputs are inputs to the primitive domain. Therefore, the vertex domain output semantics are primitive domain input semantics. The primitive domain input semantics are also the primitive domain output semantics. Specifically, POSITION is a clip-space position that is typically represented in floating point format. COLORn is a primary (n=0) and secondary (n=1) color (front-facing color if two-sided color assignment enabled) that is typically represented in a floating point format. BCOLn is a back-facing primary (n=0) and secondary (n=1) color that is typically represented in a floating point format. TEXCOORDn is a texture coordinate set n that is typically represented in a floating point format. FOG is a fog coordinate that is typically represented in a floating point format. CLPn is a clip coordinate n that is typically represented in a floating point format. PSIZ is a point size that is typically represented in a floating point format. Additional semantics may be specified for some embodiments of the present invention.

Primitive program entry functions do not have output variables. Unlike vertex and fragment programs that generate results based on output parameters, primitive programs output vertices using emitVertex functions. Vertex programs output a vertex for each input vertex. Fragment programs output zero or one fragment for each input fragment. In contrast, primitive programs output zero or more primitives for a set of input vertices. The vertex set lengths are inferred by primitive program compiler based on the specified primitive input profile modifier. The stream of vertices received by a primitive program is separated into the vertex sets, and each vertex set includes the number of input vertices that correspond to the expected inputs for each primitive input profile modifier shown in TABLE 1.

The output primitive type may be inferred by primitive program compiler 200 from the input primitive type. For example, the output primitive type is point when the input primitive type is point. The output primitive type is line when the input primitive type is line or line adjacency. The output primitive type is triangle when the input primitive type is triangle or triangle adjacency. Alternatively, the output primitive type may be specified using a primitive output profile modifier.

Primitive Output Profile Modifiers

The vertices emitted by a primitive program can form points, line strips, or triangle strips. A single primitive program emits only one of the output primitive types, e.g., point, line, or triangle. A primitive output profile modifier may be specified that is applied to the primitive program's entry function. In particular, a primitive output profile modifier may be specified in order to output a different type of primitive than is specified by the primitive input profile modifier. Primitive output profile modifiers are specified as POINT_OUT, LINE_OUT, and TRIANGLE_OUT. The point output profile modifier emits vertices that are assembled to render points. The line output profile modifier emits vertices that are assembled to render line strips. The triangle output profile modifier emits vertices that are assembled to render triangle strips.

Each primitive program has a primitive output type that is determined based only on the primitive output profile modifier for the primitive program's entry function. Primitive program compiler 200 may generate a warning if a primitive program calls a function having a primitive output profile modifier that does not match that of the primitive program's entry function.

Attribute Arrays

A primitive program receives a stream of vertices and associated attributes, e.g., color, normal vector, texture coordinates, position, or the like, as input. The primitive program may also receive "uniform" parameter constants that are used to process the vertices based on their usage in the program. The associated attributes are specified as an array that is sized by primitive program compiler 200 based on the number of vertices in the input primitive type. For example a triangle primitive type has three arrays of attributes, one attribute array per vertex. The attribute array element values are initialized to the values of each corresponding vertex sent to the geometry program when each program instance is executed. Using structures of attribute arrays is preferred to using arrays of attribute structures since the attribute structures are fixed. The attribute arrays of the present invention may be defined to have more or fewer attributes.

"AttribArray< >," as shown in TABLE 2, is a predefined template used to declare input variables for the array of attributes accepted by a primitive program and it is unique to geometry profiles. Because the attribute arrays are unsized, they can be used in helper functions that are called by different primitive programs with varying input primitive types. As shown in TABLE 2, "position" acts like an array with as many elements as the primitive profile modifier mandates. This is 3 for the TRIANGLE input primitive type because a triangle primitive is assembled from 3 vertices. The semantics for the variable applies to every element of the array. Therefore, elements of the position attribute array, position[0], position [1], and position[2] all use the POSITION semantic.

As with any array, elements of attribute arrays may be accessed using the "[ ]" operator. The ".length" accessor for a primitive profile array declared with AttribArray< > may be used to determine how many elements are included in the attribute array. For example, in the "simple" function shown in TABLE 2, position.length would evaluate to 3 because the profile modifier is TRIANGLE. As shown in TABLE 3, arrays are allowed to use AttribArray< >.

TABLE 3 typedef float4 Float4Array[4];
AttribArray<Float4Array> texcoord : TEXCOORD0

In this example, texcoord[0][0], texcoord[1][0], and texcoord [2][0] all have the TEXCOORD0 semantic while texcoord[2] [1], texcoord[1][3] have the TEXCOORD1 and TEXCOORD3 semantics, respectively.

The AttribArray< > usage can be used for typedefs and variable definitions other than in the primitive program entry function as shown in TABLE 4.

TABLE 4 typedef AttribArray<float4> PositionSet;
void TRIANGLE simple(PositionSet position :
POSITION, uniform float4
flatColor)

However, nested use of AttribArray< > as shown in TABLE 5 is an error.

TABLE 5

AttribArray<AttribArray<float4>> bogus; // error

AttribArray< > array declarations may be used in local variables or in non-entry functions, such as the helper function shown in TABLE 6. The perspectiveDivideAll helper function may be used generically by primitive program entry functions with differing input primitive profile modifiers and the attribute arrays will be sized accordingly based on the primitive input profile modifier provided for each primitive program entry function.

TABLE 6

```
void perspectiveDivideAll(AttribArray<float4>
position : POSITION, out float3
result[6])
{
   for (int i=0; i<position.length; i++) {
      result[i] = position[i].xyz / position[i].w;
   }
}
```

Emitting Vertices

Primitive programs write a set of output variables with associated vertex semantics and then "emit" a vertex. The emitted vertex is formed by the current state of the output variable at emit time. A primitive program may emit zero or more vertices. In some embodiments of the present invention the primitive processor may impose a limit on the number of vertices that are emitted for a primitive program. In other embodiments of the present invention, primitive program compiler 200 may infer the upper bound for the maximum vertex count based on a primitive processor imposed limit or a programmer specified limit. Some primitive programs may be too complex for primitive program compiler 200 to determine the upper bound due to branching or data-dependent program behavior. For those primitive programs a predetermined default upper bound may be used.

Limiting the number of vertices emitted may facilitate efficient parallel execution of the primitive program using a multi-threaded primitive processor. In particular, because hardware resources, such as registers may be allocated based on the number of vertices or attributes, it may be advantageous for the hardware to allocate the resources based on a predetermined limit. A lower limit may permit more primitive program instances to run in parallel, resulting in higher performance compared with using a higher limit. In some embodiments of the present invention, a limit may also be applied to the number of vertex attributes that are emitted for a primitive program.

When the primitive program's output type is POINT_OUT, every emitVertex call emits a point. When the primitive program's output type is LINE_OUT, the first emitVertex call in a primitive program or first emitVertex since a restartStrip call begins the assembly of a new line strip. Every second and subsequent emitVertex (until the next restartStrip) assembles a line segment from the current vertex and the immediately previous vertex. When the primitive program's output type is TRIANGLE_OUT, the first and second emitVertex call in the primitive program or the first and second emitVertex call since a restartStrip call initiates assembly of a new triangle strip. Every subsequent emitVertex (until the next restartStrip) assembles a triangle from the current vertex and the two preceding vertices.

The standard library functions shown in TABLE 7 may be used in primitive profiles.

TABLE 7 void emitVertex(...);
void restartStrip(void);

During execution of a primitive program, when emitVertex is called, a vertex is generated based on the current values of the output variables. An arbitrary number of parameters (attributes) can be passed to emitVertex and used to generate the vertex. The semantics of the passed parameters map the parameter values to hardware resources. For example, the parameters foo and bar shown in TABLE 8 result in a vertex having a position of foo and a color of bar.

TABLE 8 float4 foo : POSITION;
float4 bar : COLOR;
foo = someComputedPosition;
bar = someComputedColor;
emitVertex(foo, bar);

Parameters with unspecified or unrecognized semantics may be assigned to hardware resources based on the parameter order. Because foo and bar have recognized semantics, changing the order of the parameters, i.e., emitVertex (bar, foo); provides the same result as the emitVertex usage shown in TABLE 8.

A function, restartStrip, is used to restart strips of output primitives from a primitive program. restartStrip is used to terminate the current line or triangle strip and start another line or triangle strip originating at the next vertex. restartStrip is a no-op function for a primitive program specifying POINT_OUT primitive output. Primitive program compiler 200 maintains the ordering of the output vertices, including maintaining ordering for strips generated using the restartStrip function. Transformations by the compiler must preserve the ordering of executed emitVertex and restartStrip operations.

Shaded Primitive Attributes

Primitive programs may be configured to output per-vertex attributes that are smooth shaded (typically perspective-correct interpolated) and per-primitive attributes that are flat shaded. However, different provoking vertex conventions are used by different APIs for specifying flat shaded attributes for a primitive. Microsoft's Direct3D provides per-primitive attributes for constant interpolation (what OpenGL calls flat shading) with the first vertex of each assembled primitive, i.e., the first vertex is the provoking vertex. APIs that use the OpenGL convention provide the per-primitive attributes for flat shading with the last vertex of each assembled primitive, i.e., the last vertex is the provoking vertex. To permit programmers to write primitive programs independent of the 3D API's provoking vertex convention for flat shaded attributes, a flatAttrib routine is used to specify flat shaded attributes. Primitive program compiler 200 compiles the flatAttrib routine based on target platform 206 to support varying API conventions for specifying flat shaded attributes.

TABLE 10 shows an example of how the flatAttrib routine may be used within a primitive program to provide API independence. A first triangle stored in buffer 0 consists of positions 0, 1, and 2 and is flat shaded red. A second triangle stored in buffer 1 consists of positions 1, 2, and 0 and is flat shaded green.

TABLE 10 float flatRed : COLOR = float4(1.0, 0.0, 0.0, 1.0);
float flatGreen : COLOR = float4(0.0, 1.0, 0.0, 1.0);
AttribArray<float4> position : POSITION;
flatAttrib(flatRed, 0 : BUFFER_INDEX); // for triangle 0
emitVertex(position[0]);
flatAttrib(flatGreen, 1 : BUFFER_INDEX); // for triangle 1
emitVertex(position[1]);
emitVertex(position[2]);
emitVertex(position[0]);

When the Direct3D API is specified, the red and green colors are emitted with the first and second vertices, respectively. When an API is specified that uses the OpenGL convention, the red and green colors are emitted with the third and fourth vertices, respectively.

The VIEWPORT_INDEX and BUFFER_INDEX output semantics are provided for vertices output by a primitive program. VIEWPORT_INDEX may range from 0 through 15 and is used for flat attributes. BUFFER_INDEX may range from 0 through 7 and is also used for flat attributes.

The present invention provides many benefits for primitive programming. In particular the primitive programs may be written independent of particular 3D APIs and/or particular primitive processors. When provided with target platform 206, primitive program compiler 200 will produce microcode 205 that is optimized for execution by target platform 206. The input primitive type may be used to determine an output primitive type, vertex set lengths, and attribute array sizes. The triangle primitive program shown in TABLE 11A illustrates several of these features.

The triangle program (passthru) passes a triangle with its position and texture coordinate set 0 unmodified, but forces the color to a uniform flat color. In particular, note that the parameters provided to AttribArray are sized based on the input primitive type (triangle). The output primitive type is inferred to be the same as the input primitive type. The "for loop" iterates based on the length of the POSITION array, and is therefore also determined by the input primitive type. Finally, the flat shaded attribute is output independent of a provoking vertex convention.

TABLE 11A

TRIANGLE void passthru(AttribArray<float4>position : POSITION,
    AttribArray<float4> texCoord : TEXCOORD0,
    uniform float4 flatColor : COLOR)
{
  flatAttrib(flatColor);
  for (int i=0; i<position.length; i++) {
    emitVertex(position[i], texCoord[i]);
  }
  restartStrip( );        //no-op, just for the example
}

The triangle primitive program shown in TABLE 11A may be compiled to produce micro-code shown in TABLE 11B, excluding the comments indicated by #s. Notice that primitive program compiler 200 determines position.length is 3 based on the input primitive profile modifier being TRIANGLE and unrolls the loop for better performance. Primitive program compiler 200 also determines the "PRIMITIVE_OUT_TRIANGLE_STRIP" based on the TRIANGLE input primitive profile modifier. Primitive program compiler 200 determines that VERTICES_OUT is 3 based on the loop.

TABLE 11B triangle input primitive inferred by compiler from TRIANGLE input profile modifier
PRIMITIVE_IN TRIANGLES;
triangle strip output inferred by compiler from TRIANGLE input profile modifier
PRIMITIVE_OUT TRIANGLE_STRIP;
compiler determines exactly 3 vertices output
VERTICES_OUT 3;
output first vertex
MOV result.position, vertex[0].position;
MOV result.texcoord[0], vertex[0].texcoord[0];
EMIT;
output second vertex
MOV result. position, vertex[1].position;
MOV result.texcoord[0], vertex[1].texcoord[0];
EMIT;
output third vertex
MOV result.position, vertex[2].position;
MOV result.texcoord[0], vertex[2].texcoord[0];
MOV result.color, program.local[0];
EMIT;
restartPrimitive would generate ENDPRIM but compiler eliminates it
END The flatAttrib(flatColor) call results in a MOV to result. color for the last vertex (before the third EMIT) because primitive program compiler 200 is configured to use the provokina vertex convention for OpenGL. For Direct3D, the MOV to result.color would be right before the first EMIT.

Figure 4:
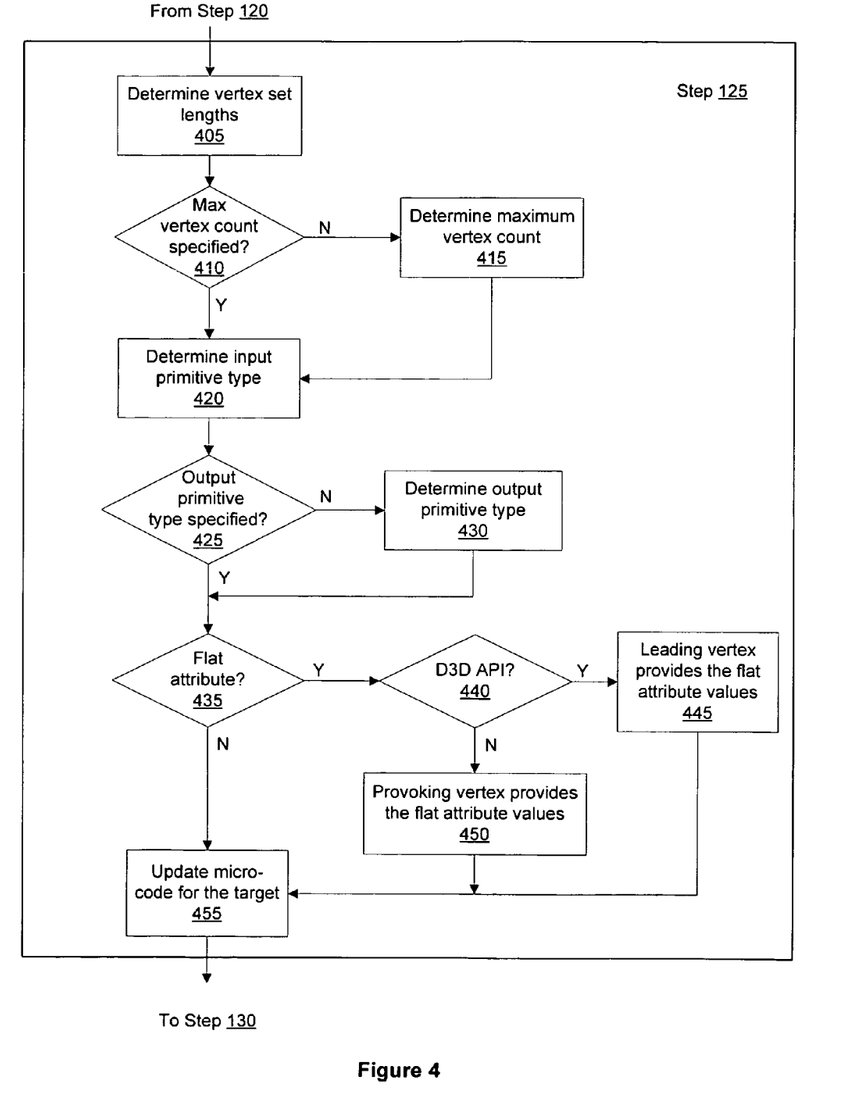
FIG. 4 illustrates a flow diagram of an exemplary method of executing a step of the flow diagram shown in FIG. 1B in accordance with one or more aspects of the present invention.

FIG. 4 illustrates a flow diagram of an exemplary method of executing step 125 of the flow diagram shown in FIG. 1B to transform micro-code 205, in accordance with one or more aspects of the present invention. The transform represented by the steps of FIG. 4 accounts for maximum vertex output count, determines input and output primitive type, and determines flat attribute convention handling. Information produced by this transformation is used by other transformations and to generate the micro-code in step 135. In step 405 primitive program compiler 200 determines the input vertex set lengths based on the input primitive type. In step 410 primitive program compiler 200 determines if a maximum output vertex count is specified, and, if so, then primitive program compiler 200 proceeds directly to step 420. Otherwise, in step 415 primitive program compiler 200 determines the maximum output vertex count.

When compiling the code shown in TABLE 11A, primitive program compiler 200 can determine that exactly 3 vertices will be output. In more complex examples, this determination may be more difficult or even beyond the compiler's capability to determine; in such cases, the compiler must make a conservative determination. For example, when "i<position [i].length" in TABLE 11A is replaced with "i<(position-.length+position[0].x)" the number of iterations cannot be determined at compile time since the value of position[0].x will vary. Therefore, primitive program compiler 200 determines a conservative maximum output vertex count, or as previously described, primitive program compiler 200 may use an explicit default limit provided by the primitive program. Maximum limits may also be determined or specified for the number of vertex attributes that may be output by the primitive program. Any maximum limits are provided to the primitive processor for use during execution of micro-code 205.

In step 420 primitive program compiler 200 determines the input primitive type specified by the primitive input profile modifier for the primitive program entry function. In step 425 primitive program compiler 200 determines if the primitive output type is specified by a primitive output profile modifier, and, if so, then primitive program compiler 200 proceeds directly to step 435. Otherwise, in step 430, primitive program compiler 200 determines that the output primitive type is the same as the input primitive type.

In step 435 primitive program compiler 200 determines if flat attributes are specified, and if not, primitive program compiler 200 proceeds directly to step 455. Otherwise, primitive program compiler 200 determines if the target platform API is specified as Direct3D (D3D), and, if so, in step 445 the leading vertex of each assembled primitive will provide the flat attribute values. Otherwise, the target platform API uses the OpenGL convention, and in step 450 the last (referred to as provoking in OpenGL) vertex of each assembled primitive will provide the flat attribute values. Primitive program compiler 200 provides the flat attribute convention information for the target platform API in micro-code 205 for use during execution of the primitive program. The compiler must also transform the compiler so that the output of flat attributes is deferred until the proper emitVertex call.

In step 135 primitive program compiler generates micro-code 205 for execution by target platform 206. Micro-code 205 includes the information provided by the translation shown in FIG. 4, e.g., input primitive type, output primitive type, maximum limits for vertices and/or attributes, and the provoking vertex convention.

Figure 5A:
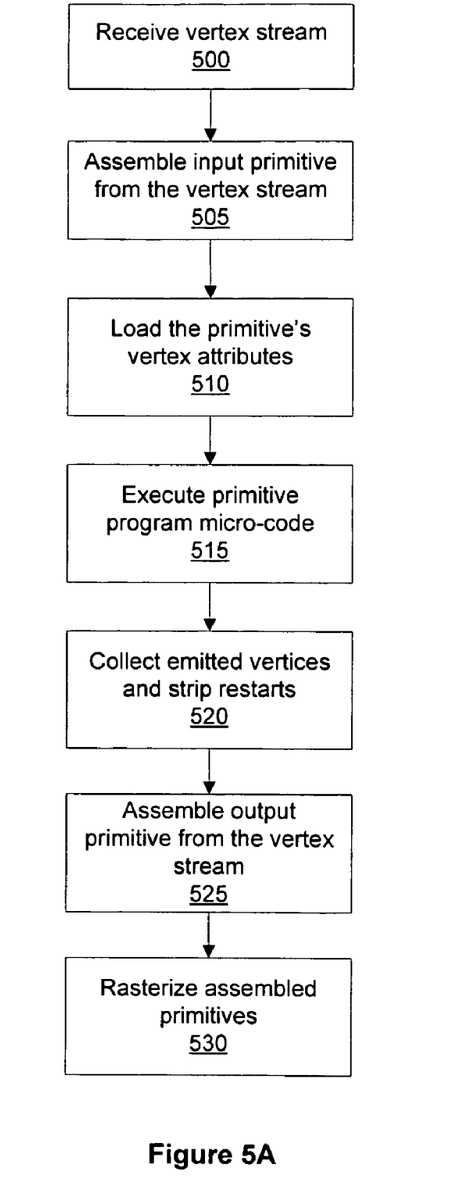
FIG. 5A illustrates a flow diagram of an exemplary method of executing primitive program micro-code produced by the compiler in accordance with one or more aspects of the present invention.

FIG. 5A illustrates a flow diagram of an exemplary method of executing micro-code 205 produced by primitive program compiler 200, in accordance with one or more aspects of the present invention. In step 500 the primitive processor receives the vertex stream output by a vertex processor. As previously described, several primitive program instances of micro-code 205 may execute in parallel within a multi-threaded primitive processor in order to process multiple streams of vertices. In step 505 an input primitive from the vertex stream is assembled based on the input primitive type. In step 510 the vertex attributes (specified by the attribute array) are loaded into registers accessible by each primitive program instance. Although a vertex may be used to assemble more than one output primitive, in some embodiments of the present invention, only one copy of the vertex attributes is stored and accessed as needed by the primitive program instances to output the assembled output primitives.

In step 515 the primitive program instance executes micro-code 205 to produce emitted vertices. In step 520 the emitted vertices and strip restarts are collected by the primitive program instance. In step 525 zero or more output primitives are assembled from the emitted vertices and output to complete execution of the primitive program instance. In step 530 the assembled primitives may be rasterized using techniques known to those skilled in the art to produce fragments.

Figure 5B:
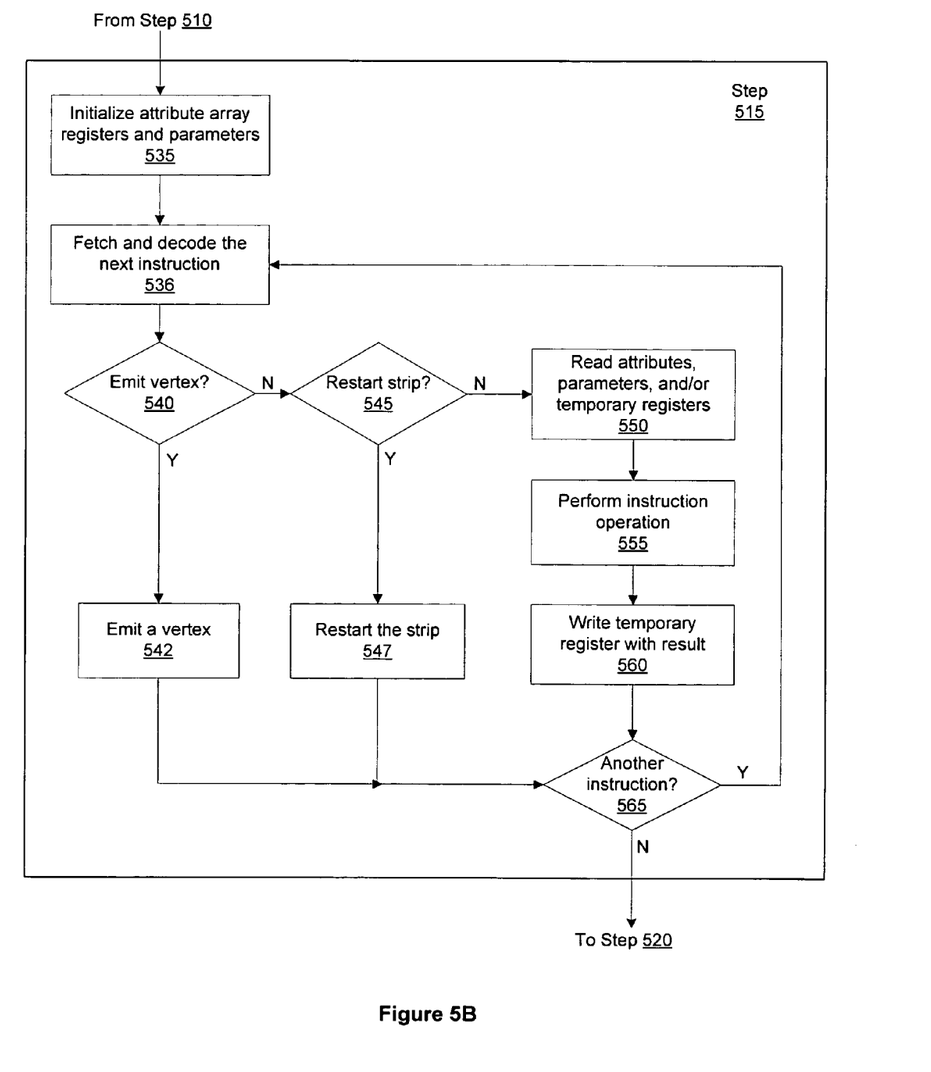
FIG. 5B illustrates a flow diagram of an exemplary method of executing a step of the flow diagram shown in FIG. 5A in accordance with one or more aspects of the present invention.

FIG. 5B illustrates a flow diagram of an exemplary method of executing step 515 of the flow diagram shown in FIG. 5A, in accordance with one or more aspects of the present invention. In step 535 the primitive program instance initializes the attribute array registers and parameters. In step 536 the primitive program instance fetches and decodes the next primitive program instruction. In step 540 the primitive program instance determines if a vertex should be emitted, and, if so, in step 542 a vertex is emitted. If, in step 540 the primitive program instance determines that a vertex should not be emitted, then in step 545 the primitive program instance determines if a triangle or line strip should be restarted. If a triangle or line strip should be restarted, then in step 547 the triangle or line strip is restarted. Any vertices emitted before a restartPrimitive (line or triangle strip) are included in the prior primitive and vertices emitted after the restartPrimitive are included in a new primitive. For example, when a line primitive is restarted 2 vertices are output and when a triangle primitive is restarted 3 vertices are output.

In step 550 the primitive program instance reads the vertex attributes, parameters, and/or any temporary registers specified as operands by the primitive program instruction. In step 555 the primitive program instance executes the instruction by performing the operation specified by the instruction. In step 560 results of the operations are stored in temporary registers specified as destination operands in the instruction. In step 565 the primitive program instance determines if another primitive program instruction should be executed, and, if so, returns to step 536. Otherwise, the primitive program instance proceeds to step 520 to collect the emitted vertices.

The primitive program shown in TABLE 12 is an example of a primitive program that may be used to perform Hermite curve interpolation. The primitive program shown in TABLE 12 may be compiled to produce micro-code for execution by a primitive processor.

TABLE 12

```
LINE void hermiteCurve(AttribArray<float4> position : POSITION,
        AttribArray<float4> tangent : TEXCOORD0,
        uniform float4 steps) // # line segments to approx. curve
{
emitVertex(position[0]);
for (int t=1; t<steps; t++) {
    float s     = t / steps;
    float ssquared = s*s;
    float scubed = s*s*s;
    float h1 = 2*scubed – 3*ssquared + 1; // calculate basis function 1
    float h2 = –2*scubed + 3*ssquared;    // calculate basis function 2
    float h3 =    scubed – 2*ssquared + s; // calculate basis function 3
    float h4 = scubed – ssquared;         // calculate basis function 4
    float4 p : POSITION = h1*position[0] + // multiply and sum
                                           all functions
                h2*position[1] +           // together to build
                                           the interpolated
                h3*tangent[0] +            // point along the curve.
                h4*tangent[1];
    emitVertex(p);
}
emitVertex(position[1]);
}
```

The primitive program shown in TABLE 13 is an example of a primitive program that may be used to perform Catmull-Rom spline interpolation. This primitive program receives 4 points as input and interpolates a section of a line between the second and third point. This primitive program uses the LINE_ADJ primitive input profile modifier. Like the primitive program shown in TABLE 12, this primitive program may also be compiled to produce micro-code for execution by a primitive processor.

TABLE 13

```
LINE_ADJ void catmullRomSpline(AttribArray<float4>
position : POSITION,
        uniform float4 steps) // # line segments to approx. curve
{
    emitVertex(position[0]);
    for (int t=1; t<steps; t++) {
        float s     = t / steps;
        float ssquared = s*s;
        float scubed = s*s*s;
        p = 0.5 *( (2*position[1] ) + ( –position[0] + position[2]) * s
            + (2*position[0] – 5*position[1] + 4*position[2] –
            position[3]) * ssquared
            + ( –position[0] + 3*position[1] – 3*position[2] +
            position[3]) * scubed);
        emitVertex(p : POSITION);
    }
    emitVertex(position[1]);
}
```

Primitive programs may be used to perform a variety of geometry operations including clipping, primitive subdivision, shadow volume generation, cube map rendering, cylindrical texture wrapping, and the like. A primitive program may be used to compute the area of each primitive and subdivide primitive's whose area exceeds a threshold value to improve the rendered image quality. Similarly, a primitive program may compute a value that is a function of the area, such as the sign or twice the area. A primitive program may also be used to compute a facet normal of each assembled primitive. The facet normals may be used to determine when to use flat shading and to perform other shading computations.

Figure 6A:
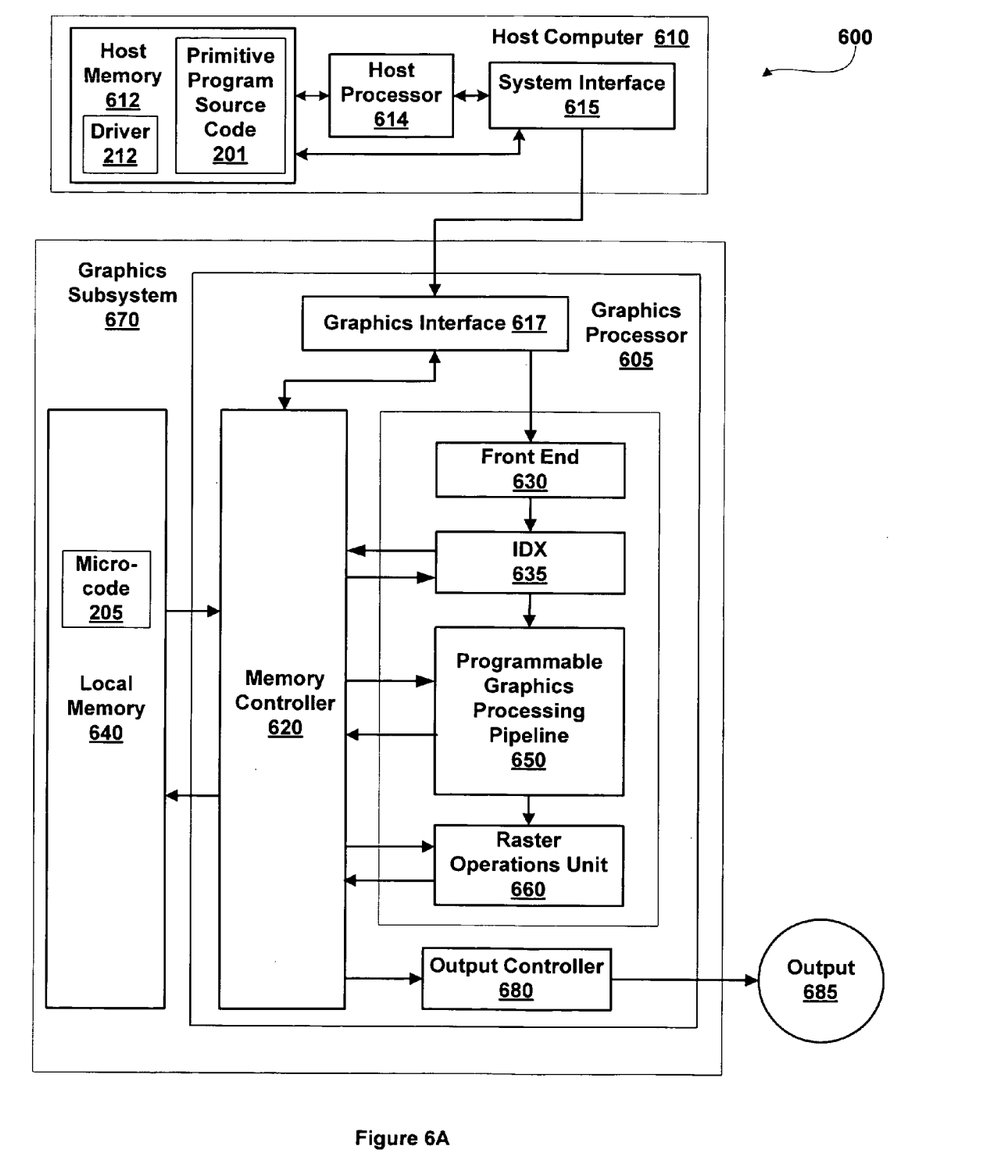
FIG. 6A illustrates a computing system in accordance with one or more aspects of the present invention.

FIG. 6A illustrates a computing system generally designated 600 including a host computer 610 and a graphics subsystem 670 in accordance with one or more aspects of the present invention. Computing system 600 may be a desktop computer, server, laptop computer, personal digital assistant (PDA), palm-sized computer, tablet computer, game console, cellular telephone, computer based simulator, or the like. Host computer 610 includes host processor 614 that may include a system memory controller to interface directly to host memory 612 or may communicate with host memory 612 through a system interface 615. System interface 615 may be an I/O (input/output) interface or a bridge device including the system memory controller to interface directly to host memory 612. Examples of system interface 615 known in the art include Intel® Northbridge.

A graphics device driver, driver 212, interfaces between processes executed by host processor 614, such as application programs, and a programmable graphics processor 605, translating program instructions as needed for execution by graphics processor 605. Driver 212 also uses commands to configure sub-units within graphics processor 605. Specifically, driver 212 may program registers within graphics processor 605 based on application programming interface (API) imposed limits for nesting levels that specify a maximum stack depth for use during multi-threaded processing.

Host computer 610 communicates with graphics subsystem 670 via system interface 615 and a graphics interface 617 within a graphics processor 605. Data received at graphics interface 617 can be passed to a front end 630 or written to a local memory 640 through memory controller 620. Graphics processor 605 uses graphics memory to store graphics data and program instructions, where graphics data is any data that is input to or output from components within the graphics processor. Graphics memory can include portions of host memory 612, local memory 640, register files coupled to the components within graphics processor 605, and the like.

Graphics processor 605 includes, among other components, front end 630 that receives commands from host computer 610 via graphics interface 617. Front end 630 interprets and formats the commands and outputs the formatted commands and data to an IDX (Index Processor) 635. Some of the formatted commands are used by programmable graphics processing pipeline 650 to initiate processing of data by providing the location of program instructions or graphics data stored in memory. IDX 635, programmable graphics processing pipeline 650 and a raster operations unit 660 each include an interface to memory controller 620 through which program instructions and data can be read from memory, e.g., any combination of local memory 640 and host memory 612.

IDX 635 optionally reads processed data, e.g., data written by raster operations unit 660, from memory and outputs the data, processed data and formatted commands to programmable graphics processing pipeline 650. Programmable graphics processing pipeline 650 and raster operations unit 660 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, and the like. Programmable graphics processing pipeline 650 and raster operations unit 660 are each optionally configured such that data processing operations are performed in multiple passes through those units or in multiple passes within programmable graphics processing pipeline 650. Programmable graphics processing pipeline 650 and raster operations unit 660 also each include a write interface to memory controller 620 through which data can be written to memory.

In a typical implementation, programmable graphics processing pipeline 650 performs geometry computations, rasterization, and pixel computations. Therefore, programmable graphics processing pipeline 650 is programmed to operate on surface, primitive, vertex, fragment, pixel, sample or any other data. For simplicity, the remainder of this description will use the term "samples" to refer to graphics data such as surfaces, primitives, vertices, pixels, fragments, or the like.

Samples output by programmable graphics processing pipeline 650 are passed to raster operations unit 660, which optionally performs near and far plane clipping and raster operations, such as stencil, z test, and the like, and saves the results or the samples output by programmable graphics processing pipeline 650 in local memory 640. When the data received by graphics subsystem 670 has been completely processed by graphics processor 605, an output 685 of graphics subsystem 670 is provided using an output controller 680. Output controller 680 is optionally configured to deliver data to a display device, network, electronic control system, other computing system 600, other graphics subsystem 670, or the like. Alternatively, data is output to a film recording device or written to a peripheral device, e.g., disk drive, tape, compact disk, or the like.

Figure 6B:
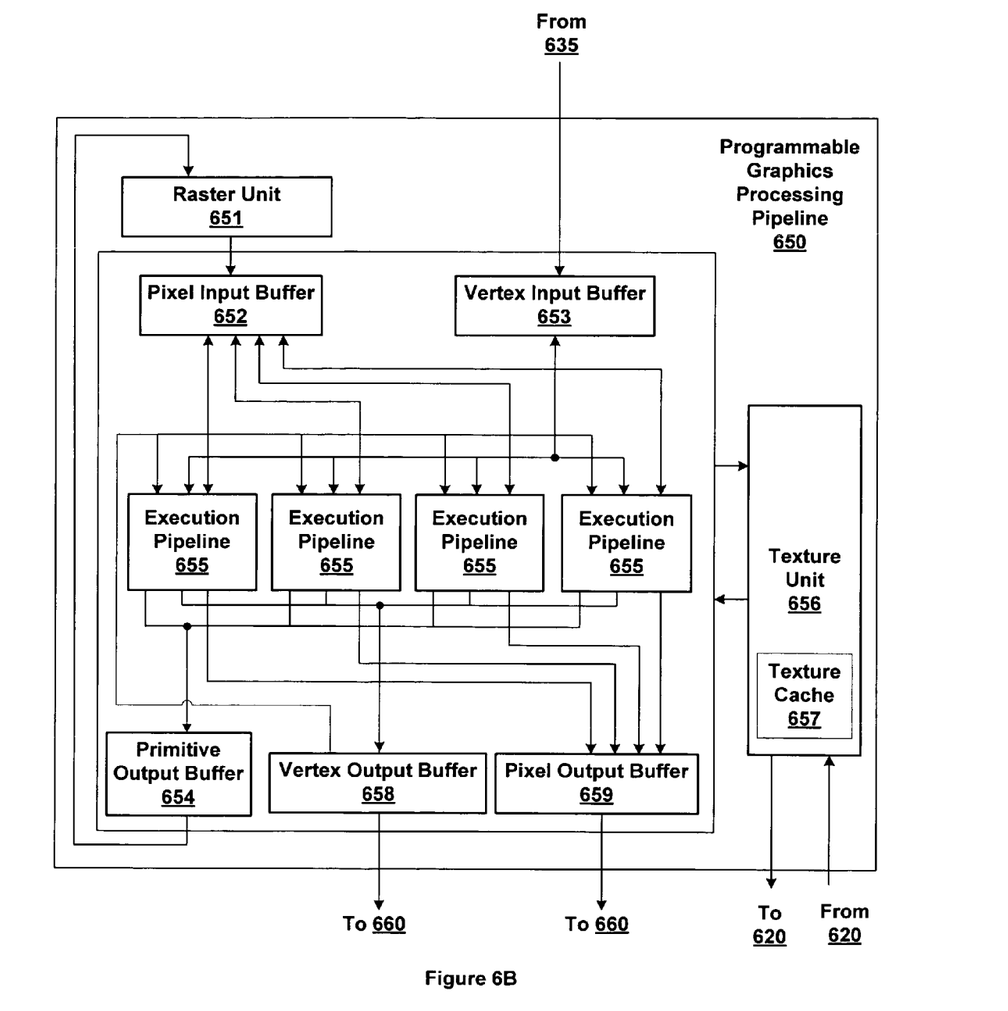
FIG. 6B illustrates the programmable graphics processing pipeline of FIG. 6A in accordance with one or more aspects of the present invention.

FIG. 6B illustrates programmable graphics processing pipeline 650 of FIG. 6A in accordance with one or more aspects of the present invention. At least one set of samples is output by IDX 635 and received by programmable graphics processing pipeline 650 and the at least one set of samples is processed according to at least one program, the at least one program including graphics program instructions. A program can process one or more sets of samples. Conversely, a set of samples can be processed by a sequence of one or more programs.

Samples, such as surfaces, primitives, or the like, are received from IDX 635 by programmable graphics processing pipeline 650 and stored in a vertex input buffer 653 including a register file, FIFO (first in first out), cache, or the like (not shown). The samples are broadcast to execution pipelines 655, four of which are shown in FIG. 6B. Each execution pipeline 655 includes at least one multi-threaded processing unit, to be described further herein. The samples output by vertex input buffer 653 can be processed by any one of the execution pipelines 655. A sample is accepted by an execution pipeline 655 when a processing thread within the execution pipeline 655 is available to process the sample. Each execution pipeline 655 signals to vertex input buffer 653 when a sample can be accepted or when a sample cannot be accepted. In one embodiment of the present invention, programmable graphics processing pipeline 650 includes a single execution pipeline 655 containing one multi-threaded processing unit. In other embodiments of the present invention, programmable graphics processing pipeline 650 includes a plurality of execution pipelines 655.

Execution pipelines 655 may receive first samples, such as higher-order surface data, and tessellate the first samples to generate second samples, such as vertices. Execution pipelines 655 may be configured to transform the second samples from an object-based coordinate representation (object space) to an alternatively based coordinate system such as world space or normalized device coordinates (NDC) space. Each execution pipeline 655 may communicate with texture unit 656 using a read interface (not shown in FIG. 6B) to read program instructions and graphics data such as texture maps from local memory 640 or host memory 612 via memory controller 620 and a texture cache 657. Texture cache 657 is used to improve memory read performance by reducing read latency. In one embodiment of the present invention, texture cache 657 is omitted. In another embodiment of the present invention, a texture unit 656 is included in each execution pipeline 655. Alternatively, each execution pipeline 655 has a dedicated instruction read interface to read program instructions from local memory 640 or host memory 612 via memory controller 620.

Execution pipelines 655 output processed samples, such as vertices, that are stored in a vertex output buffer 658 including a register file, FIFO, cache, or the like (not shown). Processed vertices output by vertex output buffer 658 are received by execution pipelines 655. Execution pipelines 655 execute a primitive program to process the vertices and produce primitives. The primitives are output to a primitive output buffer 653. A raster unit 651 receives the primitive from primitive output buffer 654 and performs scan conversion on samples, such as vertices, and outputs samples, such as fragments, to a pixel input buffer 652. Alternatively, raster unit 651 resamples processed vertices and outputs additional vertices to pixel input buffer 652.

Pixel input buffer 652 outputs the samples to each execution pipeline 655. Samples, such as pixels and fragments, output by pixel input buffer 652 are each processed by only one of the execution pipelines 655. Pixel input buffer 652 determines which one of the execution pipelines 655 to output each sample to depending on an output pixel position, e.g., (x,y), associated with each sample. In this manner, each sample is output to the execution pipeline 655 designated to process samples associated with the output pixel position. In an alternate embodiment of the present invention, each sample output by pixel input buffer 652 is processed by one of any available execution pipelines 655.

Each execution pipeline 655 signals to pixel input buffer 652 when a sample can be accepted or when a sample cannot be accepted. Program instructions configure programmable computation units (PCUs) within an execution pipeline 655 to perform operations such as tessellation, perspective correction, texture mapping, shading, blending, and the like. Processed samples are output from each execution pipeline 655 to a pixel output buffer 659. Pixel output buffer 659 optionally stores the processed samples in a register file, FIFO, cache, or the like (not shown). The processed samples are output from pixel output buffer 659 to raster operations unit 660.

One characteristic of the system disclosed in FIGS. 6A and 6B is that it may be configured to embody a SIMD (single instruction multiple data) architecture, where a thread is assigned to each sample processed in the one or more execution pipelines 655. Therefore, a single program may be used to process several sets of samples. Persons skilled in the art will appreciate that any system configured to perform the method steps of FIG. 1A, 1B, 4, 5A, or 5B, or their equivalents, is within the scope of the present invention.

Primitive programs may be used to perform a variety of geometry operations including clipping, primitive subdivision, shadow volume generation, cube map rendering, cylindrical texture wrapping, curve interpolation, spline interpolation, and the like. Primitive program compiler 200 may be configured to compile a primitive program and produce micro-code 205 for a specific target primitive processor based on the target primitive processor's capabilities. Primitive program compiler 200 also supports features of the high-level primitive program by providing conversions for different API conventions, determining output primitive types, initializing attribute arrays based on primitive input profile modifiers, and determining vertex set lengths from specified primitive input types. Therefore, the high-level primitive program may be written independent of a particular primitive processor or API and micro-code 205 will be optimized for execution by the particular primitive processor.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of processing a primitive program that is independent of a target application programming interface (API), comprising:
    obtaining the target API, wherein the target API comprises one API in a plurality of available APIs, the primitive program is compilable into a plurality of compiled versions, and each compiled version is compatible with a different API in the plurality of available APIs;
    determining a convention defined by the target API, wherein the convention conforms to a rule or a behavior specified by the target API; and
    compiling the primitive program that is independent of the target API to produce primitive program micro-code that conforms to the convention, wherein execution of the primitive program micro-code produces an ordered stream of output primitives, and wherein the primitive program micro-code is configured to generate zero or more output primitives in the ordered stream of output primitives for each input primitive.

2. The method of claim 1, wherein the target API uses conventions established by Microsoft's DirectX.

3. The method of claim 1, wherein the target API uses conventions established by OpenGL.

4. The method of claim 1, wherein the convention is a provoking vertex convention used to specify a constant attribute for an output primitive.

5. The method of claim 4, wherein the constant attribute is a flat shaded attribute that is not interpolated.

6. The method of claim 4, wherein the constant attribute is associated with each vertex of an output primitive.

7. The method of claim 5, wherein the flat shaded attribute is associated with a first vertex of an output primitive when the target API is Microsoft's DirectX.

8. The method of claim 5, wherein the flat shaded attribute is associated with the last vertex of an output primitive when the target API is OpenGL.

9. The method of claim 1, wherein the primitive program is configured to compute a value that is a function of each input primitive's area.

10. The method of claim 1, wherein the primitive program is configured to compute a facet normal vector for each input primitive.

11. A non-transitory computer readable medium storing instructions that, when executed by a processor, cause the processor to process a primitive program that is independent of a target application programming interface (API), by performing the steps of:
    obtaining the target API, wherein the target API comprises one API in a plurality of available APIs, the primitive program is compilable into a plurality of compiled versions, and each compiled version is compatible with a different API in the plurality of available APIs;
    determining a convention defined by the target API, wherein the convention conforms to a rule or a behavior specified by the target API; and
    compiling the primitive program that is independent of the target API to produce primitive program micro-code that conforms to the convention, wherein execution of the primitive program micro-code produces an ordered stream of output primitives and wherein the primitive program micro-code is configured to generate zero or more output primitives in the ordered stream of output primitives for each input primitive.

12. The computer readable medium of claim 11, wherein the target API uses conventions established by Microsoft's DirectX.

13. The computer readable medium of claim 11, wherein the target API uses conventions established by OpenGL.

14. The computer readable medium of claim 11, wherein the convention is a provoking vertex convention used to specify a constant attribute for an output primitive.

15. The computer readable medium of claim 14, wherein the constant attribute is a flat shaded attribute that is not interpolated.

16. The computer readable medium of claim 14, wherein the constant attribute is associated with each vertex of an output primitive.

17. The computer readable medium of claim 15, wherein the flat shaded attribute is associated with a first vertex of an output primitive when the target API is Microsoft's DirectX.

18. The computer readable medium of claim 15, wherein the flat shaded attribute is associated with the last vertex of an output primitive when the target API is OpenGL.

19. The computer readable medium of claim 11, wherein the primitive program is configured to compute a value that is a function of each input primitive's area.

20. The computer readable medium of claim 11, wherein the primitive program is configured to compute a facet normal vector for each input primitive.

* * * * *